US008766845B2

(12) United States Patent
Hallquist et al.

(10) Patent No.: US 8,766,845 B2
(45) Date of Patent: Jul. 1, 2014

(54) OBJECT DETECTION WITH A MULTISTATIC ARRAY USING SINGULAR VALUE DECOMPOSITION

(75) Inventors: Aaron T. Hallquist, Berkeley, CA (US); David H. Chambers, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 417 days.

(21) Appl. No.: 13/313,939

(22) Filed: Dec. 7, 2011

(65) Prior Publication Data

US 2013/0120181 A1 May 16, 2013

Related U.S. Application Data

(60) Provisional application No. 61/420,713, filed on Dec. 7, 2010.

(51) Int. Cl.
| | |
|---|---|
| *G01S 13/88* | (2006.01) |
| *G01V 3/12* | (2006.01) |
| *G01S 15/89* | (2006.01) |
| *G01S 13/00* | (2006.01) |
| *G01S 15/00* | (2006.01) |

(52) U.S. Cl.
CPC .............. *G01S 13/885* (2013.01); *G01S 13/003* (2013.01); *G01S 15/003* (2013.01); *G01V 3/12* (2013.01)
USPC ..................... 342/22; 342/27; 342/90; 367/99

(58) Field of Classification Search
CPC ... G01S 13/885; G01S 13/003; G01S 15/003; G01S 15/88; G01S 7/411; G01S 7/539; G01V 3/12
USPC ........................... 342/22, 27, 90, 195; 367/99
See application file for complete search history.

(56) References Cited

U.S. PATENT DOCUMENTS

| | | | | |
|---|---|---|---|---|
| 6,657,577 | B1 * | 12/2003 | Gregersen et al. | 342/22 |
| 8,618,976 | B2 * | 12/2013 | Paglieroni et al. | 342/22 |
| 2013/0082856 | A1 * | 4/2013 | Paglieroni et al. | 342/22 |
| 2013/0082858 | A1 * | 4/2013 | Chambers et al. | 342/22 |
| 2013/0082860 | A1 * | 4/2013 | Paglieroni et al. | 342/22 |
| 2013/0120181 | A1 * | 5/2013 | Hallquist et al. | 342/22 |

OTHER PUBLICATIONS

Chambers, D.H. and J.G. Berryman, "Target Characterization Using Decomposition of the Time-Reversal Operator: Electromagnetic Scattering From Small Ellipsoids," Inverse Problems 22:2145-2163, 2006.

(Continued)

*Primary Examiner* — John B Sotomayor
(74) *Attorney, Agent, or Firm* — Perkins Coie

(57) ABSTRACT

A method and system for detecting the presence of subsurface objects within a medium is provided. In some embodiments, the detection system operates in a multistatic mode to collect radar return signals generated by an array of transceiver antenna pairs that is positioned across a surface and that travels down the surface. The detection system converts the return signals from a time domain to a frequency domain, resulting in frequency return signals. The detection system then performs a singular value decomposition for each frequency to identify singular values for each frequency. The detection system then detects the presence of a subsurface object based on a comparison of the identified singular values to expected singular values when no subsurface object is present.

22 Claims, 9 Drawing Sheets

(56) References Cited

OTHER PUBLICATIONS

Chambers, D.H., "Target Characterization Using Time-Reversal Symmetry of Wave Propagation," International Journal of Modern Physics B 21(20):3511-3555, 2007.

Fink, Mathias and Claire Prada, "Acoustic Time-Reversal Mirrors," Inverse Problems 17:R1-R38, 2001.

Fink, Mathias et al., "Time-Reversed Acoustics," Rep. Prog. Phys. 63:1933-1995, 2000.

* cited by examiner

OBJECT DETECTION WITH A MULTISTATIC ARRAY USING SINGULAR VALUE DECOMPOSITION

CROSS-REFERENCE TO RELATED APPLICATION(S)

This application claims the benefit of U.S. Provisional Patent Application No. 61/420,713 filed Dec. 7, 2010, entitled "A TIME-REVERSAL DETECTION ALGORITHM FOR BURIED OBJECT DETECTION," which is incorporated herein by reference in its entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, medical, and other technologies seek to identify the presence of an object within a medium. For example, some technologies detect the presence of buried landmines in a roadway or a field for military or humanitarian purposes. Such technologies may use ultra wideband ground-penetrating radar ("GPR") antennas that are mounted on the front of a vehicle that travels on the roadway or across the field. The antennas are directed into the ground with the soil being the medium and the top of the soil or pavement being the surface. GPR systems can be used to detect not only metallic objects but also nonmetallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the medical field, computer-assisted tomography uses X-rays to generate tomography images for detecting the presence of abnormalities (i.e., subsurface objects) within a body. In the engineering field, GPR systems have been designed to generate spatial images of the interior of concrete structures such as bridges, dams, and containment vessels to assist in assessing the integrity of the structures. In such images, the subsurface objects represented by such images tend to appear as distinct bright spots. In addition to referring to a foreign object that is within a medium, the term "object" also refers to any characteristic of the medium (e.g., crack in the medium and change in medium density) that is to be detected. GPR systems may also be used in forensic investigations, archeological investigations, tunnel detection, and so on.

Although some current imaging techniques may generate acceptable detection results in some applications, such techniques tend to be computationally expensive, costly, and slow.

DETAILED DESCRIPTION

Figure 1:
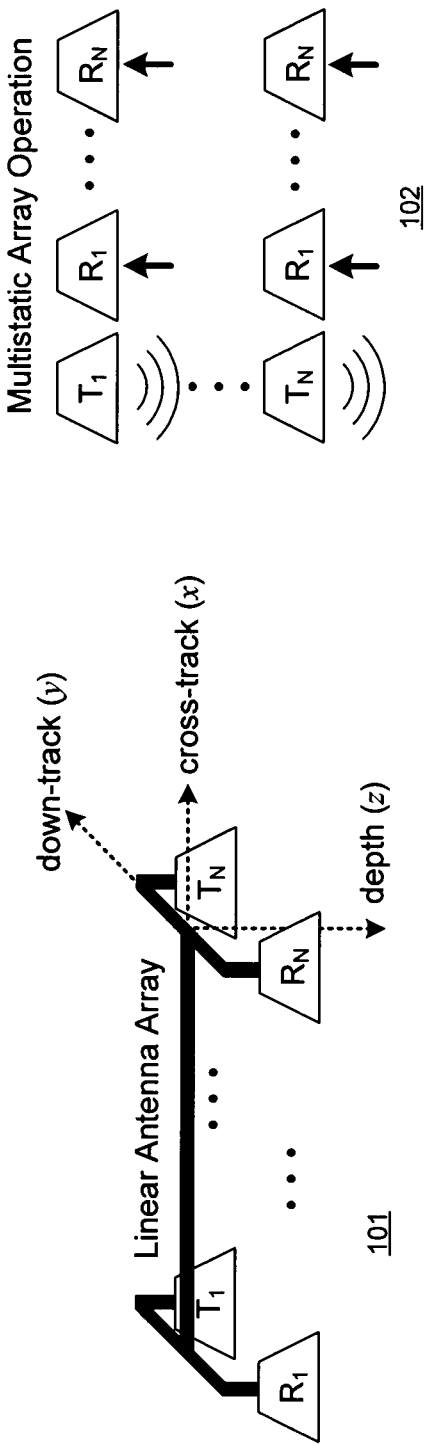
FIG. 1 is a diagram that illustrates an arrangement of a linear array of antennas.

A method and system for detecting the presence of subsurface objects within a medium is provided. In some embodiments, the detection system operates in a multistatic mode by using radar return signals associated with every possible transmitter/receiver pair within an array of transmitter and receiver antennas. For example, when the detection system is used on a roadway (or more generally a track), the array of transceiver antenna pairs may be mounted on a vehicle that travels down the roadway. Each transceiver antenna pair is associated with a location across the roadway, and the transceiver antenna pairs transmit signals and receive return signals at the various sampling locations down the roadway. Although the detection system may operate with transceiver antenna pairs that have the same numbers of transmitters and receivers, the detection system may also operate with transmitters that are not paired with receivers and even with different numbers of transmitters and receivers. After acquiring the return signals for a sampling location, the detection system transforms each return signal from its time domain to a frequency domain, forming a frequency return signal. The detection system then identifies, for at least one selected frequency, singular values for the values of the frequency return signals at that frequency. For example, the detection system may select frequencies from a range of frequencies that are empirically determined to be effective at detecting objects of interest in a particular medium. The detection system may perform a singular value decomposition ("SVD") for each frequency on a matrix with a value from the frequency return signal for that frequency for each transmitter/receiver pair. The detection system then generates a detection statistic for each frequency at the sampling location indicating whether the identified singular values for that frequency are indicative of the presence of subsurface object. For example, the detection statistic may reflect a comparison of the identified singular values to expected or estimated singular values when a subsurface object is not present. The detection system may use expected singular values that are input into the detection system after a training or collection phase and may update the expected singular values dynamically as sampling locations are processed. The detection statistics may be generated based on a log likelihood function that assumes a Gaussian distribution. The detection system may also combine the detection statistics for each frequency into an overall detection statistic for the sampling location such as by summing or averaging the detection statistics. The detection system then determines whether the individual detection statistics or overall detection statistic satisfies a detection criterion (e.g., the overall detection statistic exceeds a threshold), and if so, it indicates the presence of a subsurface object. Although the detection system is described primarily for processing ground-penetrating radar data to detect buried objects (e.g., landmines, pipes, and rocks), the detection system has many other applications, such as in the civil engineering and medical fields, may use signals other than electromagnetic signals, such as acoustic signals, and may be used with media other than ground such as water or air.

In some embodiments, the detection system employs a linear array of transmitter and receiver antennas for transmitting and receiving radar signals. For example, the linear array may consist of 16 transmitters $T_i$ and 16 receivers $R_j$ with each transmitter $T_k$ and receiver $R_k$ organized into a transceiver pair. The transceivers are equally spaced across the linear array. FIG. 1 is a diagram that illustrates an arrangement of a linear array of antennas. The linear array may be moved across a stationary surface or may be stationary with the surface moving. For example, the linear array may be mounted on a vehicle that is driven on a road to detect buried objects or may be a stationary part of a medical device in which a patient is moved under the linear array. The linear array moves in a down-track (or y) direction relative to the surface, the linear array is oriented in a cross-track (or x) direction, and the linear array transmits signals in the depth (or z) direction. For example, when a linear array is mounted on a vehicle traveling on a road, the down-track is the direction of travel, the cross-track is the direction across the road, and the depth is the direction into the road. As shown in the linear array 101, the transmitter and receiver $T_iR_i$ associated with a given transceiver pair are located at substantially the same cross-track location. The linear array has two modes of operation: multi-monostatic and multistatic. In monostatic mode, the signal transmitted by a transmitter is received only by the receiver of that same transceiver. The multi-monostatic mode refers to the operation of multiple transceivers of a linear array that each operate in the monostatic mode in sequence. When in multi-monostatic mode, at each down-track or sampling location, the detection system activates the transmitters of each transceiver in sequence across the track and collects the return signal only at the corresponding receiver of that transceiver. The detection system thus collects one return signal for each transceiver at each down-track location. The multistatic mode refers to the operation of multiple transceivers of a linear array in which each transmitter transmits in sequence, but the return signal is collected by multiple receivers, generally all the receivers. When in multistatic mode, at each down-track location, the detection system activates the transmitter of each transceiver in sequence and collects the return signal from all the receivers as illustrated in diagram 102. If the linear array has N transceivers, then the detection system collects N return signals in multi-monostatic mode and $N^2$ return signals in multistatic mode. In some embodiments, the array of transceivers may not be linear or may be organized into a grid of transceivers.

Figure 2:
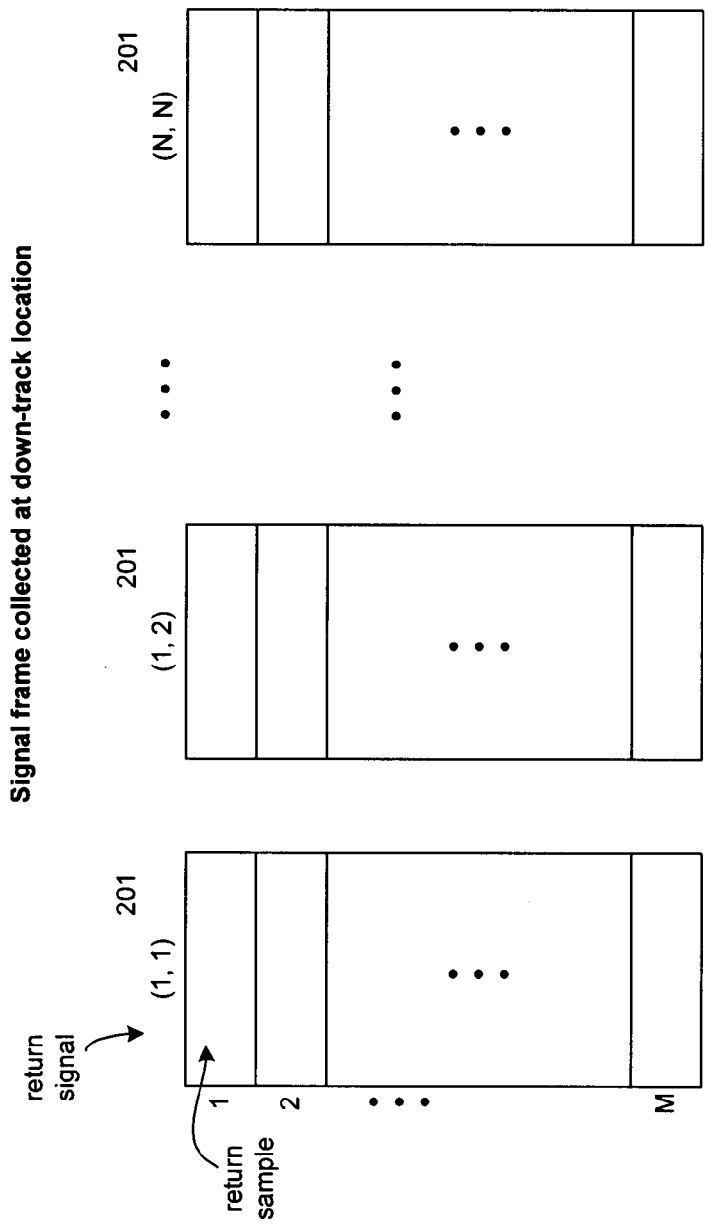
FIG. 2 is a diagram that illustrates data structures storing the return signals collected by the detection system when in multistatic mode in some embodiments.
Figure 2:
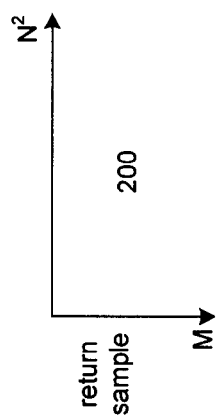

FIG. 2 is a diagram that illustrates data structures storing the return signals collected by the detection system when in multistatic mode in some embodiments. The data structures 201 store the quantized return signals. In operation, each transmitter transmits by sending a transmit signal and each receiver acquires a return signal. The receivers operate at a sampling rate and collect M return samples of the return signal per transmit signal. Each sample has a value of the amplitude of the return signal at the associated time it took for the transmitted signal to be reflected back to a receiver, so earlier collected samples may indicate reflection from the surface and later collected samples may indicate reflection off some subsurface object. The time between the transmitting of the signal and the collection of a return sample is referred to as a "fast time delay." When the detection system is in multistatic mode and the return signal is collected from each of the N receivers, the detection system collects $M \times N^2$ samples for each down-track location as indicated by diagram 200. The return signals collected at each down-track location are referred to as a signal frame.

Figure 3:
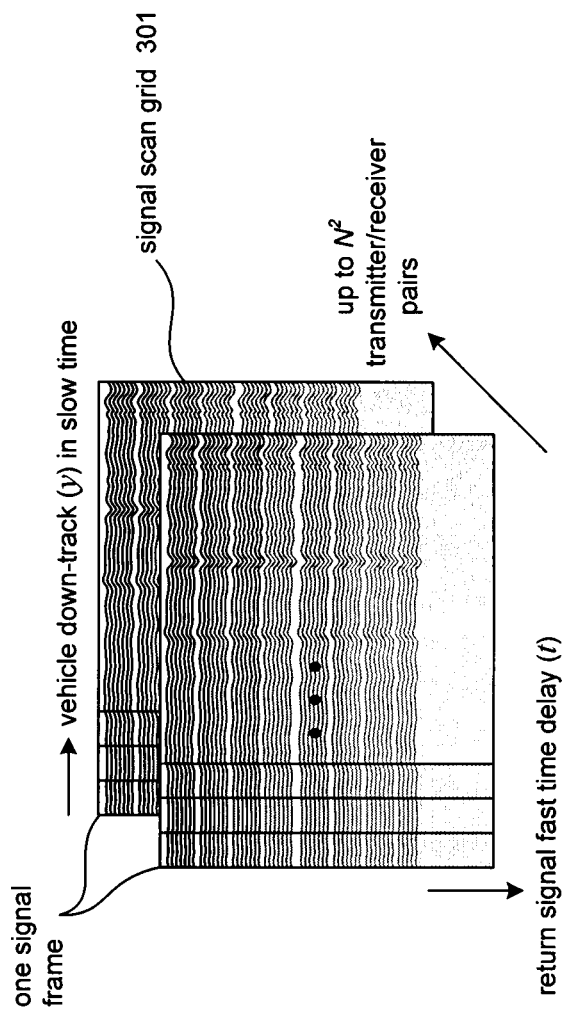
FIG. 3 is a diagram illustrating the return signals collected at multiple down-track locations by the detection system in some embodiments.

FIG. 3 is a diagram illustrating the return signals collected at multiple down-track locations by the detection system in some embodiments. Signal scan grid 301 represents the samples collected by the detection system at the down-track locations. The signal scan grid has a plane for each transmitter and receiver pair, and the planes have a column for each down-track location and a row for each sample (or fast time delay). Each column represents a return signal. A down-track signal scan is thus a sequence of return signals (a 2D array in which each column is a return signal acquired in sequence down-track), and there is one down-track signal scan for each transmitter and receiver pair.

In some embodiments, the detection system at each down-track location applies a Fourier transform that converts each return signal from the time domain to the frequency domain. For example, the M return samples of each return signal are converted into L frequencies resulting in $N^2$ frequency return signals, one for each transmitter and receiver pair. The detection system then generates a matrix A for each frequency with a row for each transmitter and a column for each receiver with the values of the matrix set to the values from the corresponding frequency return signals at the frequency of that matrix. The detection system then generates the singular values for each frequency by performing a singular value decomposition on each matrix A as indicated by the following equation:

$$A = USV^*$$

where S is a diagonal matrix containing $J_0$ singular values, U is a matrix whose $J_0$ columns contain orthogonal receiver singular vectors, V is a matrix whose $J_0$ columns contain orthogonal transmitter singular vectors, and $J_0$ is the smaller of the number of transmitters or receivers. The detection system thus generates L sets of singular values, one for each frequency. (See Fink, M. and Prada, C., "Acoustic Time-Reversal Mirrors," Institute of Physics Publishing, Inverse Problems, 17:R1-R38, 2001.)

After generating the singular values for each frequency, the detection system calculates a detection statistic using a likelihood or log likelihood function for each frequency based on a subset of the singular values for that frequency. The detection system may use an estimated or expected mean of the singular values, represented as a vector μ, and an estimated or expected covariance matrix, represented by matrix Q. The detection system may generate the expected means and covariance matrices based on prior knowledge, physical modeling, previously collected data, data collected from nearby down-track locations known to have no subsurface objects, and so on. The detection statistic may be represented by the following equation:

$$Z(f)=(s_1-\mu)^T Q^{-1}(s_1-\mu)$$

where Z(f) represents the detection statistic for frequency f, $s_1$ represents a vector of singular values for frequency f, $\mu$ represents a vector of the expected mean for frequency f, and Q represents the covariance matrix at frequency f. The detection system may then sum the detection statistics of the frequencies to generate an overall detection statistic for a down-track location.

After generating the detection statistics for a down-track location, the detection system then determines that a subsurface object is present when the overall detection statistic exceeds a threshold. The threshold may be established based on a performance criterion that factors in a desired probability of detection and probability of a false detection. (See Van Trees, H., "Detection, Estimation, and Modulation Theory: Part I," John Wiley & Sons, Inc., 1968.) The detection system may apply the performance criterion to the detection statistic for each frequency or to the overall detection statistic.

Figure 4:
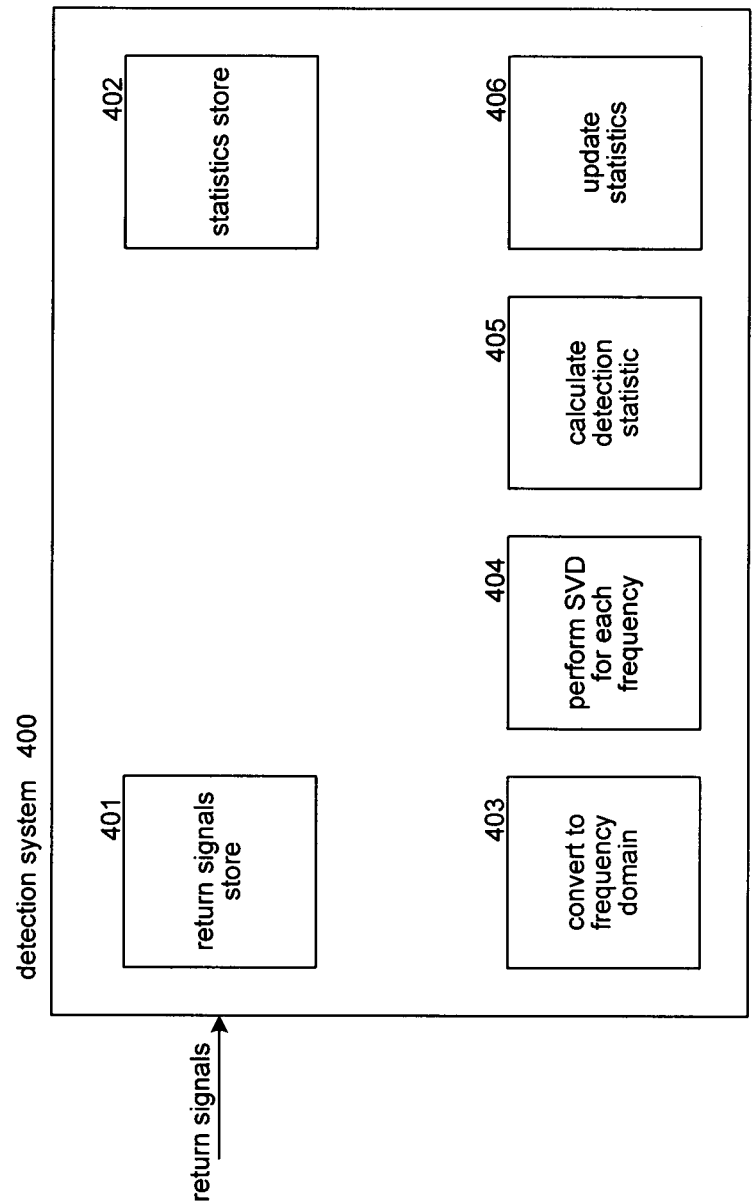
FIG. 4 is a block diagram that illustrates components of the detection system in some embodiments.

FIG. 4 is a block diagram that illustrates components of the detection system in some embodiments. The detection system 400 includes a return signals store 401, a statistics store 402, a convert to frequency domain component 403, a perform SVD for each frequency component 404, a calculate detection statistic component 405, and an update statistics component 406. The detection system inputs return signals for each down-track location and stores the return signals in the return signals store. The convert to frequency domain component converts each return signal to the frequency domain. The perform SVD for each frequency component performs a singular value decomposition for each frequency at each down-track location. The calculate detection statistic component aggregates detection statistics for each frequency based on the singular values into an overall detection statistic for each down-track location. The overall detection statistic indicates whether a subsurface object is present based on a comparison of the singular values to the statistics of the statistics store. The update statistics component updates the statistics store to reflect the singular values of each down-track location.

The computing devices on which the detection system may be implemented may include a central processing unit and memory and may include input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the detection system. The data transmission media is media for transmitting data using signals or carrier waves (e.g., electromagnetism) via a wire or wireless connection. Various functions of the detection system may also be implemented on devices using discrete logic or logic embedded as an application-specific integrated circuit. The detection system may be implemented on a computer system that is local to a vehicle to which the linear array of antennas is mounted for processing the return signals locally. Alternatively, one or more of the components may be implemented on a computer system that is remote from the linear array. In such an alternative, the data used by the various components (e.g., return signals and image frames) may be transmitted between the local computing system and remote computer system and between remote computing systems.

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
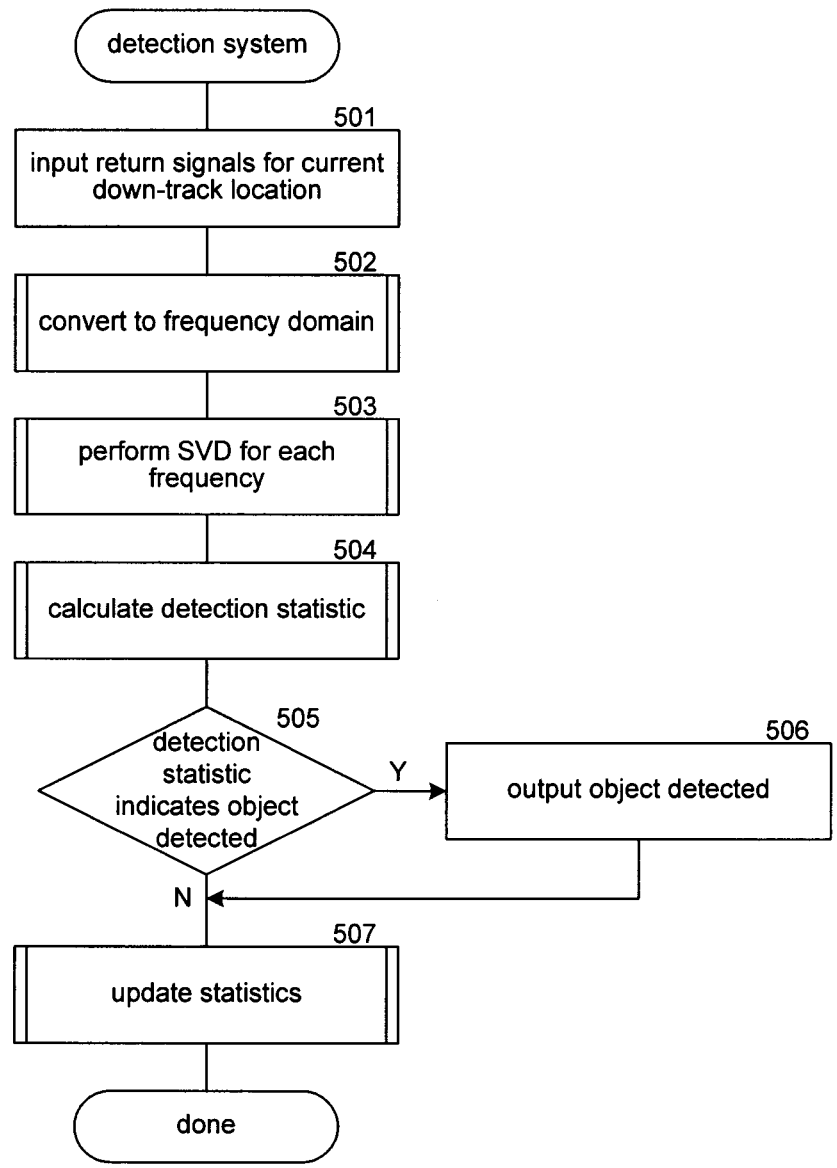
FIG. 5 is a flow diagram that illustrates processing of the detection component of the detection system in some embodiments.

FIG. 5 is a flow diagram that illustrates processing of the detection component of the detection system in some embodiments. The detection system may be invoked as the return signals for each down-track location are collected. In block 501, the component inputs the return signals for the current down-track location. In block 502, the component invokes the convert to frequency domain component to convert the return signals from the time domain to the frequency domain. In block 503, the component invokes the perform SVD for each frequency component to identify singular values for each frequency of the frequency return signals. In block 504, the component invokes the calculate detection statistic component to calculate the overall detection statistic for the current down-track location. In decision block 505, if the overall detection statistic indicates that a subsurface object is present, then the component continues at block 506, else the component continues at block 507. In block 506, the component outputs an indication that an object has been detected. In block 507, the component invokes the update statistics component to update the expected statistics (e.g., mean and covariance) for use in object detection. The component then completes.

Figure 6:
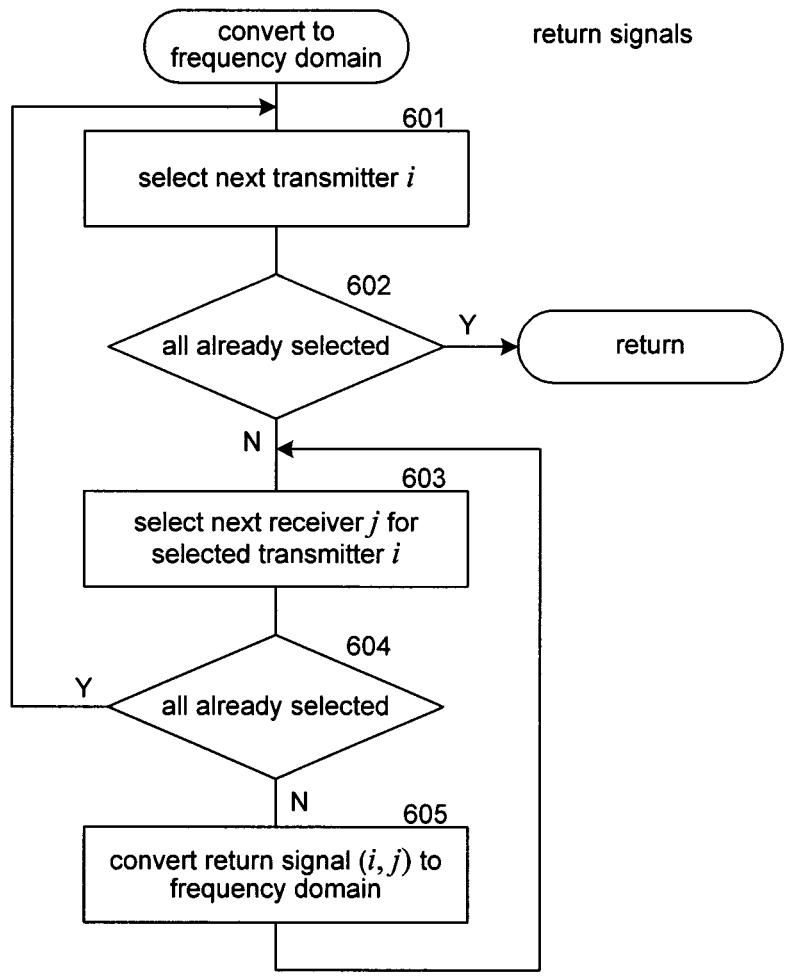
FIG. 6 is a flow diagram that illustrates the processing of the convert to frequency domain component of the detection system in some embodiments.

FIG. 6 is a flow diagram that illustrates the processing of the convert to frequency domain component of the detection system in some embodiments. The component is passed the return signals for a down-track location and converts each return signal to a frequency return signal. In block 601, the component selects the next transmitter. In decision block 602, if all the transmitters have already been selected, then the component returns, else the component continues at block 603. In block 603, the component selects the next receiver for the selected transmitter. In decision block 604, if all the receivers have already been selected for the selected transmitter, then the component loops to block 601 to select the next transmitter, else the component continues at block 605. In block 605, the component converts the return signal for the selected transmitter and receiver pair to the frequency domain (e.g., using a Fourier transform) and then loops to block 603 to select the next receiver.

Figure 7:
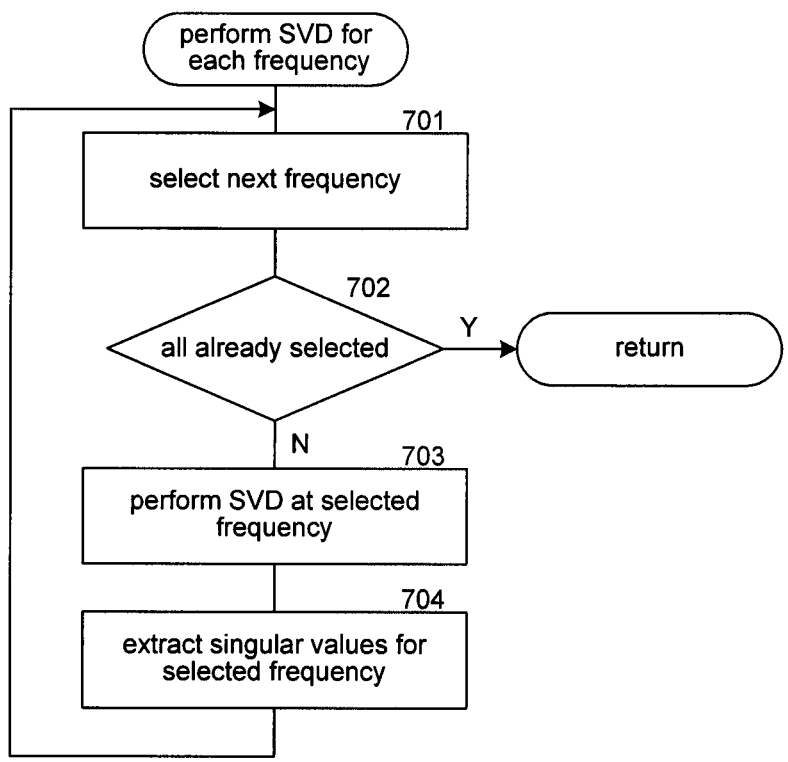
FIG. 7 is a flow diagram that illustrates the processing of the perform SVD for each frequency component of the detection system in some embodiments.

FIG. 7 is a flow diagram that illustrates the processing of the perform SVD for each frequency component of the detection system in some embodiments. The component is invoked for each down-track location and performs a singular value decomposition for each frequency. In block 701, the component selects the next frequency. In decision block 702, if all the frequencies have already been selected, then the component returns, else the component continues at block 703. In block 703, the component performs a singular value decomposition for the selected frequency. In block 704, the component extracts singular values for the selected frequency for use in object detection. The component then loops to block 701 to select the next frequency.

Figure 8:
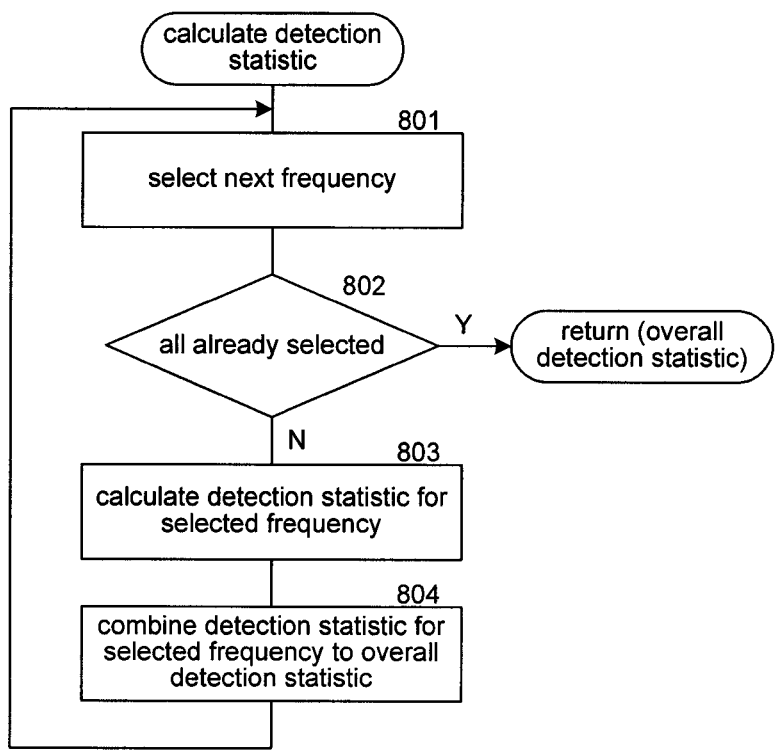
FIG. 8 is a flow diagram that illustrates the processing of the calculate detection statistic component of the detection system in some embodiments.

FIG. 8 is a flow diagram that illustrates the processing of the calculate detection statistic component of the detection system in some embodiments. The component is invoked for each down-track location and generates an overall detection statistic that provides an indication of whether a subsurface object is present. In block 801, the component selects the next frequency. In decision block 802, if all the frequencies have already been selected, then the component returns the overall detection statistic, else the component continues at block 803. In block 803, the component calculates the detection statistic for the selected frequency. In block 804, the component aggregates the detection statistic for the selected frequency into the overall detection statistic for the current down-track location. The component then loops to block 801 to select the next frequency.

Figure 9:
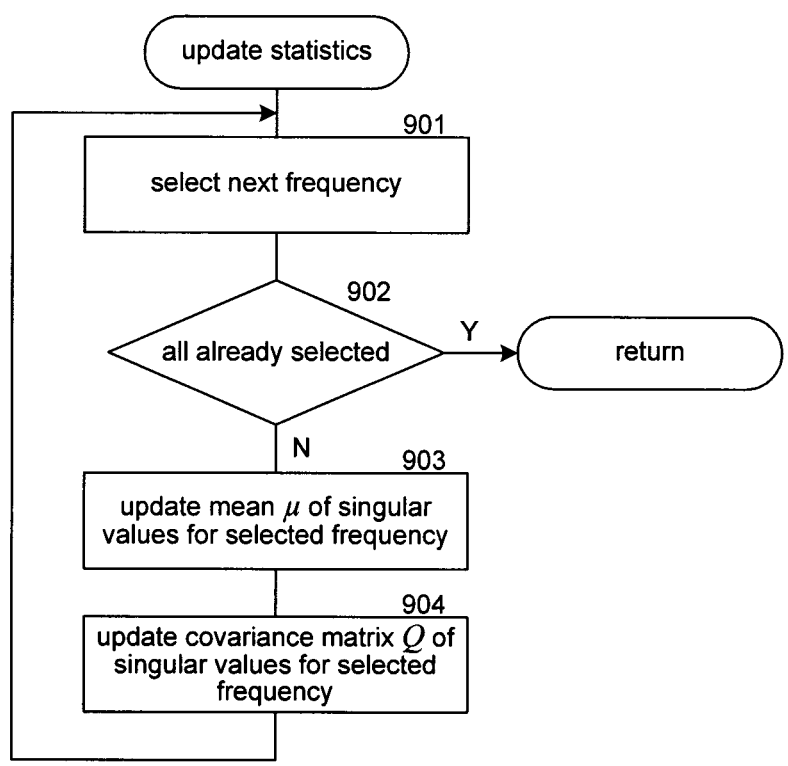
FIG. 9 is a flow diagram that illustrates the processing of the update statistics component of the detection system in some embodiments.

FIG. 9 is a flow diagram that illustrates the processing of the update statistics component of the detection system in some embodiments. The component may be invoked for each down-track location to update the expected statistics for the singular values. In block 901, the component selects the next frequency. In decision block 902, if all the frequencies have already been selected, then the component returns, else the component continues at block 903. In block 903, the component updates the mean of the singular values for the selected frequency. In block 904, the component updates the covariance matrix of singular values for the selected frequency. The component then loops to block 901 to select the next frequency.

From the foregoing, it will be appreciated that specific embodiments of the invention have been described herein for purposes of illustration but that various modifications may be made without deviating from the scope of the invention. For example, the detection system may analyze the return signals of multiple adjacent down-track locations to determine the presence of a subsurface object. The detection system may also apply various filters to the detection statistics or singular values to filter our spurious signals that may not accurately indicate the presence of a subsurface object. For example, the detection system may generate a weighted average of the detection statistics over a sequence of down-track locations to filter out spurious signals. The detection system may also store signatures indicative of singular values or detection statistics representing the presence of known objects. For example, such signatures may be collected by burying an object, acquiring return signals from traveling over the object, and generating the singular values or detection statistics from the return signals. Accordingly, the invention is not limited except as by the appended claims.

We claim:

1. A method for detecting presence of a subsurface object in a medium, the method comprising:
   for each of a plurality of down-track locations, acquiring return signals at receivers from signals emitted by transmitters into the medium, the transmitters and receivers operating in a multistatic mode; and
   for each down-track location,
      for each return signal acquired by a receiver, generating a frequency return signal by converting the return signal into a frequency domain signal;
      for each frequency,
         performing a singular value decomposition on values for the frequency return signals at that frequency to identify singular values; and
         generating a detection statistic for that frequency based on the identified singular values; and
      determining whether the generated detection statistics indicate the presence of a subsurface object at that down-track location.

2. The method of claim 1 wherein the medium is the ground and the transmitters and receivers form a linear array of transceivers.

3. The method of claim 1 wherein the subsurface object is an explosive device.

4. The method of claim 1 wherein the determining of whether the generated detection statistics indicate the presence of a subsurface object includes combining the generated detection statistic for each frequency into an overall detection statistic for each down-track location.

5. The method of claim 1 wherein the determining of whether the generated detection statistics indicate the presence of a subsurface object is based on a comparison of the identified singular values to identified singular values of prior down-track locations.

6. The method of claim 5 wherein the identified singular values of prior down-track locations are aggregated into mean values and covariant values for each frequency.

7. The method of claim 1 wherein the determining of whether the generated detection statistics indicate the presence of a subsurface object is based on a log likelihood function.

8. The method of claim 7 wherein the log likelihood function assumes a Gaussian distribution.

9. The method of claim 1 wherein the determining of whether the generated detection statistics indicate the presence of a subsurface object is based on a likelihood function.

10. The method of claim 1 wherein the transmitters emit a ground-penetrating radar signal.

11. The method of claim 1 wherein the transmitters emit an acoustic signal.

12. A computer-readable storage device storing computer-executable instructions for controlling a computing device to detect presence of a subsurface object in a medium at a target location, by a method comprising:
   inputting return signals received at receivers from signals emitted by transmitters at the target location into the medium, the transmitters and receivers operating in a multistatic mode;
   for each return signal, generating a frequency return signal by converting the return signal into a frequency domain signal;
   for a plurality of frequencies,
      performing a singular value decomposition on values for the frequency return signals at that frequency to identify singular values; and
      generating a detection statistic for that frequency based on the identified singular values; and
   determining whether the generated detection statistics indicate the presence of a subsurface object at the target location.

13. The computer-readable storage device of claim 12 wherein the method is performed at a plurality of target locations that are down-track locations.

14. The computer-readable storage device of claim 13 wherein the determining is performed at only a subset of the target locations.

15. The computer-readable storage device of claim 13 wherein the determining of whether the generated detection statistics indicate the presence of a subsurface object is based on a comparison of the identified singular values to identified singular values of prior target locations.

16. The computer-readable storage device of claim 15 including aggregating the identified singular values of target locations into statistics for each frequency.

17. The computer-readable storage device of claim 12 wherein the generated detection statistics are based on a log likelihood function.

18. The computer-readable storage device of claim 12 wherein the generated detection statistics are based on a likelihood function.

19. A computing device for detecting a presence of a subsurface object in a medium from return signals acquired at a plurality of down-track locations by receivers from signals emitted by transmitters into the medium, the transmitters and receivers operating in a multistatic mode, comprising:
- a component that, for a down-track location, inputs return signals at receivers from signals emitted by transmitters at that down-track location into the medium, the transmitters and receivers operating in a multistatic mode;
- a component that generates a frequency return signal for a return signal by converting a return signal into a frequency domain signal;
- a component that identifies singular values for the values for the frequency return signals at a frequency; and
- a component that determines whether the identified singular values indicate the presence of a subsurface object at that down-track location.

20. The computing device of claim 19 including a component that updates statistics reflecting mean and covariance of the identified singular values at each frequency.

21. The computing device of claim 19 including a component that aggregates the detection statistics for each frequency at a down-track location to an overall detection statistic for that down-track location.

22. The computing device of claim 19 including a component that generates a detection statistic for a frequency based on the identified singular values for that frequency and identified singular values of prior down-track locations.

* * * * *